United States Patent
Franken et al.

(10) Patent No.: US 7,028,323 B2
(45) Date of Patent: Apr. 11, 2006

(54) SYSTEM AND METHOD FOR DELIVERING RERUN VIDEO PROGRAMMING ON NON-HDTV DIGITAL SIDE CHANNELS

(75) Inventors: Kenneth A. Franken, Iowa City, IA (US); Jack Perry, Cedar Rapids, IA (US)

(73) Assignee: Decisionmark Corp., Cedar Rapids, IA (US)

( * ) Notice: Subject to any disclaimer, the term of this patent is extended or adjusted under 35 U.S.C. 154(b) by 998 days.

(21) Appl. No.: 09/681,846

(22) Filed: Jun. 15, 2001

(65) Prior Publication Data

US 2001/0027555 A1    Oct. 4, 2001

(51) Int. Cl.
*H04N 9/00* (2006.01)
*H04N 7/16* (2006.01)

(52) U.S. Cl. .............................. 725/9; 725/34; 725/46
(58) Field of Classification Search ............... 725/9
See application file for complete search history.

(56) References Cited

U.S. PATENT DOCUMENTS

| | | | |
|---|---|---|---|
| 4,701,934 A | 10/1987 | Jasper | |
| 4,706,121 A | 11/1987 | Young | |
| 5,535,430 A | 7/1996 | Aoki et al. | |
| 5,587,715 A | 12/1996 | Lewis | |
| 5,797,082 A | 8/1998 | Lusignan | |
| 5,812,123 A * | 9/1998 | Rowe et al. | 725/43 |
| 5,950,127 A | 9/1999 | Nitta et al. | |
| 6,028,600 A | 2/2000 | Rosin et al. | |
| 6,147,642 A | 11/2000 | Perry et al. | |
| 6,446,261 B1 * | 9/2002 | Rosser | 725/34 |
| 6,681,394 B1 * | 1/2004 | Fujita et al. | 725/32 |
| 6,901,603 B1 * | 5/2005 | Zeidler et al. | 725/39 |
| 2005/0204388 A1 * | 9/2005 | Knudson et al. | 725/58 |

FOREIGN PATENT DOCUMENTS

| | | |
|---|---|---|
| EP | 834798 A3 | 8/1998 |
| GB | 2328811 A | 3/1998 |
| JP | 06-268934 | 9/1994 |
| WO | WO 00/01149 | 2/0000 |
| WO | WO 00/33576 | 6/2000 |

OTHER PUBLICATIONS

Printed three pages of a website on Apr. 13, 2000. The Web address was www.antennaweb.org.
Kageyama M. et al, "A Free Time-Shift DVD Video Recorder", IEEE Transactions on Consumer Electronics, IEEE Inc.
New York, US, vol. 43, No. 3, Aug. 1, 1997, p. 469-473, XP000742519, ISSN: 0098-3063.
Printed web page for iBlast.com on May 19, 2003.
iBlast Press Release "Major Broadcast Groups Unite to Establish iBlast", Mar. 7, 2000.

(Continued)

*Primary Examiner*—Vivek Srivastava
(74) *Attorney, Agent, or Firm*—Simmons, Perrine, Albright, Ellwood, P.L.C.

(57) ABSTRACT

A system for delivering rerun digital programming via digital side channels and the Internet to consumers, which system includes a video recorder which provides the rerun programming in other than real time.

35 Claims, 1 Drawing Sheet

OTHER PUBLICATIONS iBlast Press Release "iBlast Unveils Comprehensive Video-On-Demand Solution", Apr. 16, 2001.

iBlast Press Release "iBlast Goes Gunning for Gamers With New Wireless Game Distribution", May 17, 2002.

Printed web page of dtvplus.com on May 19, 2003.

DTV Plus Press Release "DTV Plus showcases service at Intel's Center for Datacasting Innovation", Oct. 25, 1999.

DTV Plus Press Release "Capitol Broadcasting and accessDTV First to Offer Convergence of DTV and PC", May 9, 2001.

* cited by examiner

SYSTEM AND METHOD FOR DELIVERING RERUN VIDEO PROGRAMMING ON NON-HDTV DIGITAL SIDE CHANNELS

CROSS REFERENCE TO RELATED APPLICATIONS

This application relates to co-pending patent application entitled "GUIDE WITH PROGRAM DELIVERING LINKS", having Ser. No. 09/681,275, which was filed on Mar. 12, 2001, by Kenneth A. Franken, Toufic Moubarak and Jack Perry, and assigned to the same assignee, which patent application is incorporated herein in its entirety by this reference.

BACKGROUND OF INVENTION

In recent months, digital television has been gaining popularity with U.S. viewers. More and more local broadcasters are switching to digital transmission of television signals. In 2002, it is believed that almost all U.S. local broadcasters will be broadcasting at least part of their programming in a digital format. By 2006, many expect that digital television will be the exclusive mode of delivering live and rerun television programming in the United States.

While digital television broadcasting is a necessity for delivering high definition television (HDTV), the converse is not the case. In fact, there may be some advantages to not providing HDTV broadcasts at all times. For example, if a digital television station is not broadcasting in HDTV mode, then it is not using up its allotted spectral bandwidth. The extra bandwidth can then take the form of several digital side bands or side channels. These side channels can be used to broadcast any type of programming. Data programming, in the form of non-video textual information, consumes very little bandwidth. A typical local broadcaster's spectral allotment can simultaneously support scores of mere data channels or at least several non-HDTV television video broadcasts.

While it has been widely accepted that these side channels will exist, their optimal use has not been well understood. The most salient problem is that if the station is broadcasting some of its programming in HDTV mode, it may not be able to simultaneously and continuously provide a digital non-HDTV video side channel. This creates serious limitations of the utility of this unused bandwidth.

Consequently, there exists a need for improved methods and systems for utilizing digital side channels.

SUMMARY OF INVENTION

It is an object of the present invention to provide a system and method for delivering television and radio programming on digital side bands.

It is a feature of the present invention to utilize a viewer feedback scheme which gathers real time viewership information from an electronic program guide.

It is another feature of the present invention to include automation of rerun programming selection based upon the viewer feedback scheme.

It is yet another feature of the present invention to include a personal video recorder which receives and stores rerun video from digital sidebands.

It is an advantage of the present invention to achieve efficient use of digital side channels for stations with intermittent high definition transmissions.

The present invention is an apparatus and method for delivering rerun programming on digital side channels, which is designed to satisfy the aforementioned needs, provide the previously stated objects, include the above-listed features, and achieve the already articulated advantages. The present invention is carried out in a non-continuous or non-real time manner in a sense that the delivery is intermittent or is done in other than real time.

Accordingly, the present invention is a system and method including a feedback mechanism for automatically selecting programming to be made available to personal video recorders on digital side channels and a mechanism for delivery of rerun programming in other than real time.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
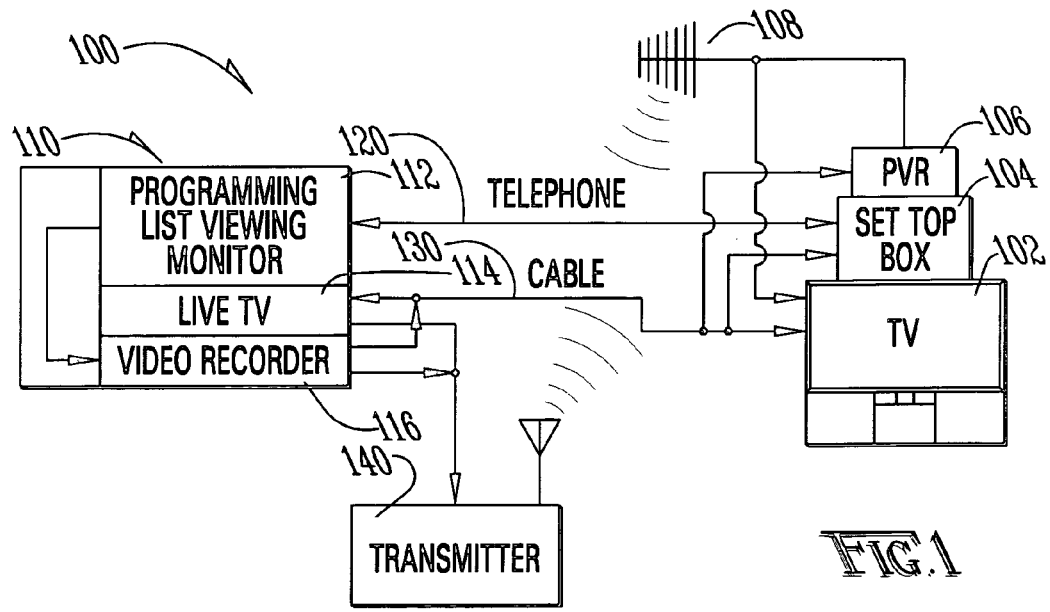
FIG. 1 is a block diagram of the major functional components of one embodiment of television and PVR recording system, of the present invention which uses a telephone line to communicate programming and viewership information.

Now referring to the drawings wherein like numerals refer to like matter throughout, and more specifically to FIG. 1, there is shown a television/radio programming delivery system of the present invention generally designated 100; a source of video programming 110 is also shown. It should be noted that the present description is focused upon television and video signals, but the innovative aspects of the present invention could be used with respect to radio programming and audio only components of television and video signals.

This source of video programming 110 may be a local HDTV television station or other source of HDTV video programming. Source of video programming 110 generally provides live digital television service to many consumers coupled to the source of video programming 110 via standard cable television (CATV) co-axial cable, via terrestrial over the air broadcasts, or some other means of delivery of digital video signals. CATV cable 130 or digital television transmitter 140 would be the most common means of delivering digital video signals to these consumers" television set 102. Digital television transmitter 140 would transmit signals which are received by the consumer with digital television antenna 108, which signals are then supplied to the television set 102 and to the set top box 104, and/or personal video recorder 106. The television set 102 is preferably a digital television, but it may be a conventional analog television coupled to a set top box 104 which receives digital signals and converts them to analog signals for use by the television set 102.

Set top box 104 may have several other functions as well. For example, set top box 104 could be a digital personal video recorder much like the TiVo system or the Replay TV system. TiVo is a registered trademark of TiVo, Inc., 2160 Gold Street, P.O. Box 2160, Alviso, Calif. 95002; and Replay TV is a registered trademark of Replay TV, Inc., 1945 Charleston Road, Mountain View, Calif. 94043. Essentially, these well-known devices communicate via telephone lines 120 with some remote source of video program listings. These TiVo or Replay TV service sites are not typically associated with a local television station as shown in FIG. 1, but these services could be combined or coordinated so that FIG. 1 is generally accurate. Set top box 104 may receive a list of programming via telephone line 120 in a well-known manner. The consumer programs set top box 104 to record programs from a programming guide which is downloaded, via telephone line 120, from programming list and viewing monitor 112. The set top box 104 and personal video recorder 106 are shown as separate devices. When this is the case, the set top box 104 can provide the two-way communication via telephone line 120 between the consumer and the source of video programming 110, and the personal video recorder 106 can perform the actual step of recording the programming. In other arrangements, set top box 104 and personal video recorder 106 could be combined in a single unit. This single unit would be similar to the TiVo and Replay TV systems in use today except that they would permit recording in a non-continuous and other than real time manner, as well as recording live broadcasts in real time. Telephone line 120 is representative of various possible communication systems which could be employed to communicate such information. For example, telephone line 120 could be replaced with the Internet, over-the-air RF transmissions, or signals sent over the CATV cable 130. Telephone line 120 is included as a possible currently preferred embodiment, but it is anticipated that it may not remain the preferred means of communication between programming list and viewing monitor 112 and the consumer in the future. Set top box 104 and personal video recorder 106 may be simple variations of currently available products. The applicants assert that these variations or changes required are sufficiently simple that a person skilled in the art, with the aid of this description of the invention, could design a functional system without undue experimentation.

The present invention of FIG. 1 could function as follows: the consumer decides to watch live television. The consumer selects the channel to watch, using a live programming list which has been downloaded, via telephone line 120, from programming list and viewing monitor 112. Programming list and viewing monitor 112 is coupled to a large number of consumers who are watching many different channels. Programming list and viewing monitor 112 acts as a viewing monitor, in that it captures, tallies and processes the viewership information from the many consumers. Programming list and viewing monitor 112 makes a determination of programs which receive the highest viewership, and these programs are ranked. This ranking of popular programs being watched is provided to video recorder 116. Programming list and viewing monitor 112 may be a personal computer or other processor which is adapted to perform the functions of providing a programming list and monitoring the viewership of the programs on that list. It should be understood that the functions of providing a list and monitoring of viewership need not be performed by the same computer, but it may be preferred that they are so combined.

Video recorder 116 may be a very large recorder or banks of smaller coordinated recorders. The video recorder 116 need not store the programming in a digital file suitable for playing by the personal video recorder 106 (or with respect to FIG. 2 discussed below the PC digital TV board 204, which can act just like a personal video recorder 106 if provided with suitable software). Video recorder 116 may or may not have a recording segment which records the programming in the same format as it is broadcast live via source of live television broadcasts 114. It may have a conversion segment which converts the stored programming to a file format which is directly usable by personal video recorder 106. It may be preferred to transmit the rerun programming to the television set 102 in a format similar to the live format and leave to the personal video recorder 106, the conversion of the stream of digital information to a file to be saved to a hard disk in personal video recorder 106.

Video recorder 116 may record every program which is being provided to the consumer via source of live television broadcasts 114, or it may, because of resource limitations, record only the most popular programs being watched. In any scenario, the video recorder 116 may, in some way, use the ranking of popular programs to regulate recording, retention, or delivery of rerun programs to consumers.

In one embodiment of the present invention, programming list and viewing monitor 112 and video recorder 116 could cooperate, so that programming list and viewing monitor 112 makes a real time determination of the popularity of each programming being watched by the various consumers coupled to the system. Programming list and viewing monitor 112 or video recorder 116 could compare the rankings or "ratings" of each of the programs to a threshold level. If the show has sufficiently high ranking or ratings, then it could be selected to be recorded by video recorder 116. The threshold may be a fixed threshold or a threshold which is higher than the least popular program which has been recently recorded. Depending upon storage space for programming, and the ability for simultaneous recording, these thresholds may vary from system to system.

For "live" TV, 116 would need to record all content (or at least the start of the content) and then use ratings information to decide which content to keep and which content to recycle for space. In other words, the ratings information will, in general, lag somewhat behind the content, so the content must be buffered to account for this lag.

It should be understood that this automation of the recording process based upon rankings of live television broadcast could be performed by programming list and viewing monitor 112, video recorder 116 or a separate and distinct processor (not shown). The amount of integration of the processing functions of the present invention is a matter of designer's choice, and it is expected that it will vary, depending upon any peculiar requirements of any particular system.

In one embodiment for recording live TV, a recorder could record all the content and after a relatively short time, ratings information from a rating organization, such as Nielson, etc., could be used to select the most popular programs for retention.

When the source of live television broadcasts 114 is broadcasting in other than HDTV mode, there will be a capability to provide substantial access to programs stored by video recorder 116. The consumer could, even after the fact, decide to record a program that was broadcast earlier. For example, if a consumer were to meet with some friends who said that they had watched a great program the night before on television, under a prior art system such as TiVo or Replay TV, they would be unable to record. But with the present invention, the video recorder 116 may have recorded and retained the program, based upon the determination of the program's ranking by programming list and viewing monitor 112. Programming list and viewing monitor 112 would display to the consumer not only a list of live future programming which will become available, but also a listing of previously run programming which could be delivered from the video recorder 116. If a viewer sees a previously run program on the list which appeals to the viewer, the viewer can select the rerun program for delivery. The program could be in HDTV format or non-HDTV format. Depending upon available bandwidth in the digital side bands or side channel at any given time, the selected rerun programming can be delivered at varying transmission rates. The terms "digital side bands" or "digital side channels" as used herein are intended to refer to transmission spectra which is unused by a primary live digital television broadcast. Video recorder 116 may provide the digital signal to the personal video recorder 106 in less than real time. This would often be the case when the program being rerun is an HDTV formatted program, and it is being transmitted during a time when source of live television broadcasts 114 is broadcasting live in HDTV format. However, if the program being provided is non-HDTV programming, and it is being delivered at a time when the source of live television broadcasts 114 is delivering non-HDTV programming, the delivery rate of the rerun programming may be at a rate faster than done with real time viewing. The delivery of the rerun programming need not be continuous. The program may be divided into separate smaller files and delivered at different times. The consumer, of course, will need to wait for the entire rerun program to be received by the personal video recorder 106 before it can be viewed. The rerun programming is, therefore, delivered to the consumer who made a decision to record/receive a program after the live broadcast has occurred.

Depending on space and bandwidth limitations, it might be advantageous to compress the stored programming by using lower quality or alternative encoding schemes. This compression could be performed before the content is initially stored, saving storage space and bandwidth, or just prior to broadcast, saving bandwidth only.

Ratings information could also be applied to the stored content to determine what content is kept. As content ages, cumulative or recent ratings information could be used to decide whether the content is dropped or compressed to free up storage space. Discussions of space vs. popularity tradeoffs in a caching network are commonplace on Internet web pages, such as freenetproject.org.

The recording of the rerun programs would be similar to current TiVo and Replay TV systems in the sense that the personal video recorder 106 would be programmed to start and stop recording at particular times and on predetermined digital side channels. (Note: the consumer would not need to know the precise times of delivery of the rerun program; the personal video recorder 106 would automatically start and stop as programmed.) The signal actually being received by the personal video recorder 106 may be at other than real time and, therefore, may not be capable of being viewed in real time by a television set tuned to the side channel. The source of video programming 110 would create a schedule of times for broadcasting the rerun programs to be recorded by the many personal video recorders 106 by the many users. The scheduling of the rerunning of the programs can be manipulated in many ways. The viewer's selection of the program need not be communicated back to source of video programming 110. It could be done completely at the viewer's location; this assumes that the programming list and viewing monitor 112 provides a complete copy of the programming list to the set top box 104 or the personal video recorder 106.

While it may not be necessary for the viewer's recording choice to be conveyed to the source of video programming 110, it may be desirable for other business reasons to provide this information, so that it may be used internally or be reported to interested third parties.

Viewer recording choices could also be used as feedback to control the scheduling of re-run broadcasts. That is, programs with a higher number of outstanding requests would have a higher priority compared to programs with a low number of outstanding requests. The field of determining resource allocation among processes with varying priorities is well studied; e.g. computer OS design.

Figure 2:
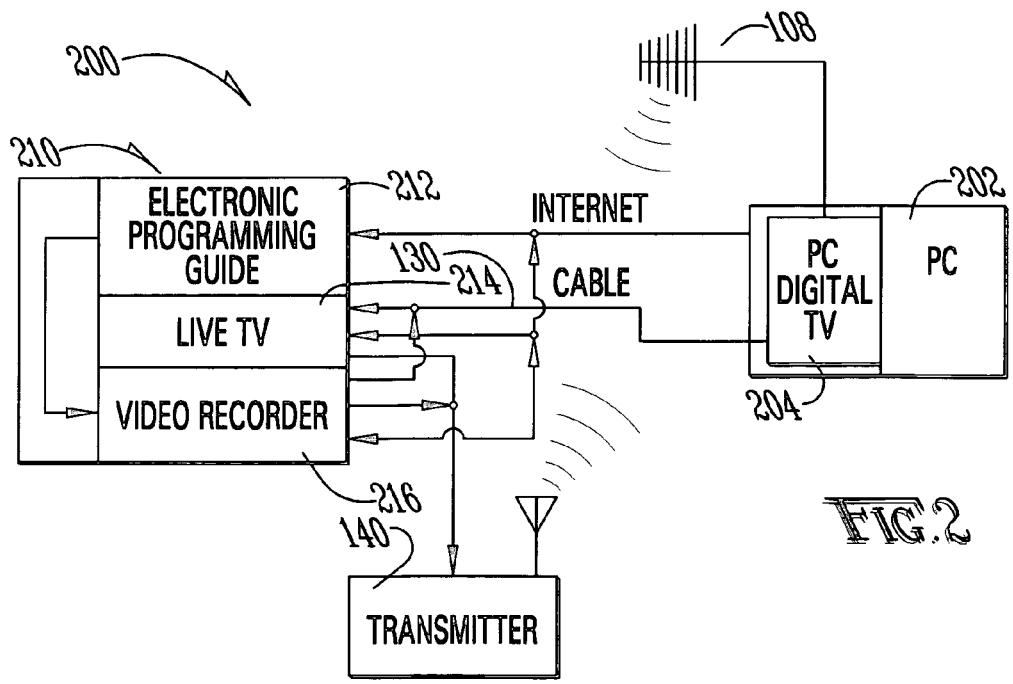
FIG. 2 is a personal computer variation of the present invention which uses the Internet to communicate programming and viewership information and in some instances, video programming delivery as well.

Now referring to FIG. 2, there is shown an alternate embodiment of the present invention in which the consumer is not viewing a program via a television set, but instead via a personal computer 202. Personal computer 202 has disposed therein a PC digital TV board 204, which is used to receive television signals, via CATV cable 130, or via a transmission from digital television transmitter 140. PC digital TV board 204 tunes these signals and provides the personal computer 202 with a signal which is viewable by the personal computer 202. PC digital TV board 204 could also be adapted and configured with software to perform the function of a PVR similar to personal video recorder 106. Also, personal computer 202 could receive programming via the internet without the need for a PC digital TV board 204. It is understood that personal computer 202 and television set 102 need not be viewed as distinct entities. In fact, it is well understood that television sets may be configured to provide functionality more commonly associated with personal computers and vice versa. The present invention is intended to be read inclusively so as to cover future convergence of television with personal computing. The system generally designated 200 of FIG. 2 performs essentially the same functions as the system 100 of FIG. 1. System 200 includes an electronic programming guide with tuning links 212, which could be a website on the Internet, such as described in the above-referenced co-pending patent application. Electronic programming guide with tuning links 212 could also provide a monitoring function similar to that performed by programming list and viewing monitor 112 where a ranking of the most popular programs being watched on live television is maintained. This ranking is provided to internet coupled video recorder 216 just as was done with respect to the system 100 (FIG. 1). Internet coupled video recorder 216 is similar to video recorder 116 except that it is coupled to the internet and is capable of delivering files (rerun programming) via the internet. Similarly, source of live television broadcasts 214 could be a digital television station similar to source of live television broadcasts 114 except that it is also adapted and configured to provide programming over the Internet.

It is thought that the method and apparatus of the present invention will be understood from the foregoing description and that it will be understood from the foregoing description that it will be apparent that various changes may be made in the form, construction, steps and arrangement of the parts and steps thereof, without departing from the spirit and scope of the invention or sacrificing all of their material advantages. The form herein described is merely a preferred or exemplary embodiment thereof.

What is claimed is:

1. A system of providing rerun programming to consumers comprising:

means for providing a plurality of consumers with a list of live television programs which are available to said plurality of consumers;

means for monitoring which programs in said list of live television programs are being watched by said plurality of consumers, said means for monitoring further for generating a ranking of programs on said list of live television programs based upon a popularity characteristic of said programs on said list;

means for recording at least a portion of said programs on said list of live television programs;

means for electronic delivery of rerun programs to said plurality of consumers in a manner of program delivery which is other than real time delivery of programming which is capable of being viewed by a television set in real time; and, wherein at least one of said means for recording and said means for electronic delivery is operationally responsive to said ranking of programs.

2. A system of claim 1 wherein said manner of program delivery is via digital side channels of a terrestrially broadcast digital television signal.

3. A system of claim 2 wherein said means for providing a plurality of consumers with a list of live television programs which are available to said plurality of consumers further includes a means for providing a plurality of rerun programming choices to a plurality of consumers.

4. A system of claim 3 wherein said means for recording is operatively responsive to said ranking of programs; and said means for recording is automated such that when a ranking of any particular program exceeds a threshold, it is recorded.

5. A system of claim 4 wherein said threshold is dependent upon a lowest ranking of a group of programs previously recorded.

6. A system of claim 2 wherein said means for electronic delivery transmits said rerun programs at variable speeds, depending at least in part upon whether a live broadcast television signal is being transmitted in HDTV format.

7. A system of claim 6 wherein said variable speeds include other than real time transmission rates.

8. A system of claim 7 wherein said other than real time transmission rates include non-continuous transmissions of a single program is said rerun programs.

9. A system of claim 7 wherein said other than real time transmission rates includes a transmission rate which is faster than real time when said live broadcast television signal is being transmitted in other than HDTV format.

10. A system of claim 7 wherein said other than real time transmission rates include a transmission rate which is slower than real time when said live broadcast television signal is being transmitted in HDTV format and one of said rerun programs is in HDTV format.

11. A system of claim 10 wherein said transmission rate which is slower than real time is non-continuous.

12. A system of claim 2 wherein said means for providing is an electronic program guide on an Internet website having record commanding links therein.

13. A system of claim 12 wherein said programming guide is downloaded by a personal computer, which is adapted and configured to receive, store and display digital television programming.

14. A system of claim 13 wherein a viewer's selection of a program to be recorded is not communicated over the Internet, but used by an applet associated with the programming guide after being downloaded, to said personal computer.

15. A system of claim 11:

wherein said means for providing is an electronic program guide on an Internet website having record commanding links therein;

wherein said programming guide is downloaded by a personal computer, which is adapted and configured to receive, store and display digital television programming; and, wherein a viewer's selection of a program to be recorded is not communicated over the internet, but used by an applet associated with the programming guide after being downloaded, to said personal computer.

16. A system for providing rerun programming to consumers comprising:

a source of digital television programming signals;

said source of digital television programming signals simultaneously transmitting a plurality of distinct signals for different television programs, including a first signal which is a real time digital video signal and a second signal which is an other than real time digital video signal;

a personal computer (PC), being configured to tune digital television programming signals;

said PC being configured to record digital television programs as digital data files;

said PC further being configured to capture said digital television programming signals, at a transmission rate which is at a transmission rate other than a transmission rate for real time viewing of television programming;

said transmission rate is at a higher than real time rate when said source of digital television programming is broadcasting other programming in a non-high definition television format and said transmission rate is lower than real time when said source of digital television programming is broadcasting other programming in a high definition television format;

said PC further being configured to record said digital television programming signals which have been captured at rates other than a rate for real time viewing of television programming; and, said PC further being configured to visually present to a viewer for viewing at a real time viewing rate, recorded digital programs which have been previously received by said PC as digital television programming signals at transmission rates other than a transmission rate for real time viewing of television programming.

17. A system of claim 16 wherein said source of digital television programming is an over-the-air broadcast television station.

18. A system of claim 17 wherein said source of digital television signals is operating under a broadcasting license from a governmental agency regulating television broadcasting.

19. A system of claim 17 wherein said PC is configured to capture said digital signals via one of: cable, over the air, and satellite.

20. A system of claim 17 wherein said source of digital television programming signals maintains a recording of programming provided via said first signal and provides to said PC via said second signal, selected portions of said programming provided via said first signal.

21. A system of claim 20 where said source of digital television programming signals is responsive to viewer ratings of programming provided via said first signal, so that said selected portions of said programming have a higher popularity rating compared with non-selected portions of said programming provided via said first signal.

22. A system of claim 21 wherein said viewer ratings are provided to said source of digital television programming signals from an external source.

23. A system of claim 21 wherein said viewer ratings are generated by said source of digital television programming signals in response to user interaction with an electronic program guide displayed on said PC and a plurality of geographically distributed and independently owned and operated PCs.

24. A system of claim 23 wherein said viewer ratings are representative of user program recording requests via said electronic program guide displayed on said PC and a said plurality of geographically distributed and independently owned and operated PCs.

25. A system of claim 23 wherein said viewer ratings are representative of viewer requests for live programming via an electronic program guide displayed on said PC and a said plurality of geographically distributed and independently owned and operated PCs.

26. A system of claim 21 wherein said source of digital television programming signals further comprises a storage means for locally storing said selected portions.

27. A system of claim 26 wherein said storage means is configured to be responsive to said viewer ratings.

28. A system of claim 27 wherein said storage means is configured to be subject to automatic deletions of programming stored thereon in response to viewer ratings indicating a higher popularity of new programming available for retention in comparison to programming currently stored by said storage means.

29. A system of claim 28 wherein said storage means is responsive to both said viewer ratings and a time characteristic representative of a length of time since a particular portion of programming was originally transmitted via said first signal.

30. A system of claim 29 wherein said storage means is configured to have a bias toward retention of local programming content originating from said source of digital television programming signals.

31. A method of transmitting rerun digital television programming comprising the steps of:
providing a live digital television signal, in a frequency spectrum range allocated to a station by a governmental agency, which regulates television broadcasting;
storing programming content broadcast by said live digital television signal;
re-transmitting said programming content, on an unused segment of said frequency spectrum, which is not used by a live digital television signal simultaneously broadcast from said wherein step of re-transmitting is a non-real time rate transmission rate and is responsive to a viewer ratings characteristic associated with said programming content; wherein storing programming content includes a step of determining whether to retain particular older stored programming content based at least in part upon viewer rating characteristics of newer stored programming content; and wherein step of re-transmitting is done at a rate less than a real time transmission rate during times when said station is broadcasting a live digital video signal in high definition television format.

32. A method of claim 31 further comprising the step of receiving and thereafter viewing said programming content at a personal computer (PC) separated from said station.

33. A method of claim 32 wherein said viewer rating is responsive to user interaction with an electronic programming guide displayed on said PC.

34. A method of claim 33 further comprising the step of using information representative of user selections of programming on said electronic programming guide to generate said viewer ratings.

35. A method of claim 34 wherein said user selections of programming are user requests for live programming.

* * * * *

UNITED STATES PATENT AND TRADEMARK OFFICE
CERTIFICATE OF CORRECTION

| | | |
|---|---|---|
| PATENT NO. | : 7,028,323 B2 | Page 1 of 1 |
| APPLICATION NO. | : 09/681846 | |
| DATED | : April 11, 2006 | |
| INVENTOR(S) | : Kenneth A. Franken and Jack Perry | |

It is certified that error appears in the above-identified patent and that said Letters Patent is hereby corrected as shown below:

In Column 10, Claim 31, line 11, after the word "said", please insert -- station; --

Signed and Sealed this

First Day of August, 2006

JON W. DUDAS
*Director of the United States Patent and Trademark Office*